US008549960B2

(12) United States Patent
Hoff

(10) Patent No.: US 8,549,960 B2
(45) Date of Patent: Oct. 8, 2013

(54) TOOL FOR ADJUSTING MILITARY PHONE JACK

(76) Inventor: William T. Hoff, Sunnyvale, CA (US)

( * ) Notice: Subject to any disclaimer, the term of this patent is extended or adjusted under 35 U.S.C. 154(b) by 151 days.

(21) Appl. No.: 13/136,866

(22) Filed: Aug. 11, 2011

(65) Prior Publication Data

US 2012/0144962 A1 Jun. 14, 2012

Related U.S. Application Data

(60) Provisional application No. 61/372,794, filed on Aug. 11, 2010.

(51) Int. Cl.
*B25B 13/28* (2006.01)
*B23B 31/173* (2006.01)

(52) U.S. Cl.
USPC ..... 81/113; 279/46.3

(58) Field of Classification Search
USPC ........ 81/125, 124.2, 111-116, 53.2, 55, 90.9; 279/2.02, 2.11, 32, 37, 43.2, 46.1, 279/46.2, 46.3
See application file for complete search history.

(56) References Cited

U.S. PATENT DOCUMENTS

| | | | | |
|---|---|---|---|---|
| 1,438,391 | A * | 12/1922 | Nutter | 81/114 |
| 1,615,201 | A * | 1/1927 | Stowe et al. | 81/113 |
| 2,555,836 | A * | 6/1951 | Werich | 81/128 |
| 3,776,562 | A | 12/1973 | Gross et al. | |
| 4,106,784 | A | 8/1978 | Davis | |
| 4,229,999 | A * | 10/1980 | Rottigni | 81/9.24 |
| 4,862,773 | A * | 9/1989 | Batten | 81/55 |
| 5,213,015 | A * | 5/1993 | Disston, Jr. | 81/90.9 |
| 5,664,467 | A * | 9/1997 | Breeze | 81/114 |
| 5,740,704 | A * | 4/1998 | Payne | 81/60 |
| 7,878,092 | B1 * | 2/2011 | Eby et al. | 81/112 |

OTHER PUBLICATIONS

JackTight web page: http://jacktight.com/about/tutorial, dated Dec. 21, 2010.
Jack the Gripper web page: http://www.frets.com/HomeShopTech/Products/JackTheGripper/jackthegripper.html, dated Dec. 21, 2010.

* cited by examiner

*Primary Examiner* — David B Thomas
(74) *Attorney, Agent, or Firm* — Richard Ekstrom

(57) ABSTRACT

Various embodiments of the invention provide a tool for adjusting a military phone jack. A tool for adjusting a military phone jack, the tool comprising a modified head cap screw, an expanding split collet, a collet receiver shaft, and a jam nut driver. The modified head cap screw has an edge of the head cap machined to an angle between 1 and 89 degrees with respect to the unmachined portion of the head cap which is further from the screw shaft. The expanding split collet comprises a central hole throughout its longitudinal axis with the hole of sufficient diameter to receive the modified head cap screw, two or more slits through the exterior wall of the collet and extending from one end of the collet, and a machined inner diameter of the end of the collet having the slits, the angle of the machined inner diameter matching the angle on the head cap of the modified head cap screw. The collet receiver shaft has an internal thread drilled into one end of the shaft, the internal thread receiving the thread end of the modified head cap screw. The jam nut driver comprises a central hole throughout its longitudinal axis, the hole of sufficient diameter to receive the expanding split collet and the collet receiver shaft, the jam nut driver having a grip end and a nut end, the nut end machined to receive a jam nut.

11 Claims, 5 Drawing Sheets

TOOL FOR ADJUSTING MILITARY PHONE JACK

RELATED APPLICATIONS

This application claims the benefit of priority to Provisional U.S. Patent Application No. 61/372,794, entitled "IT IS A TOOL FOR TIGHTENING GUITAR JACKS WHILE PREVENTING THE JACK FROM SPINNING AND TEARING THE WIRES OUT", filed Aug. 11, 2010; the aforementioned priority application being hereby incorporated by reference for all purposes.

FIELD OF THE INVENTION

Embodiments of the present invention relate to a tool for adjusting a military phone jack, such as in tightening or loosening or adjusting the jam nut on a military phone jack.

BACKGROUND OF THE INVENTION

Guitars contain a jack, also referred to as a military phone jack, into which electrical leads are plugged. To ensure good connection of the lead into the jack, the jack should be securely lodged on the guitar. Securing of the jack to the guitar is typically accomplished through use of a jam nut. Wrenches and pliers currently in use to tighten the jam nut suffer from the disadvantage of causing the jack to spin during the tightening, which can then lead to tearing and otherwise damaging the wires attached to jack. Thus, there is a need for a tool for tightening military phone jacks which does not cause spinning of the jack during tightening of the jam nut.

SUMMARY OF THE INVENTION

Embodiments of the invention provide a tool for adjusting a military phone jack. The tool comprises a modified head cap screw, an expanding split collet, a collet receiver shaft, and a jam nut driver. The modified head cap screw has an edge of the head cap machined to an angle between 1 and 89 degrees with respect to the unmachined portion of the head cap which is further from the screw shaft. The expanding split collet comprises a central hole throughout its longitudinal axis with the hole of sufficient diameter to receive the modified head cap screw, two or more slits through the exterior wall of the collet and extending from one end of the collet, and a machined inner diameter of the end of the collet having the slits, the angle of the machined inner diameter matching the angle on the head cap of the modified head cap screw. The collet receiver shaft has an internal thread drilled into one end of the shaft, the internal thread receiving the thread end of the modified head cap screw. The jam nut driver comprises a central hole throughout its longitudinal axis, the hole of sufficient diameter to receive the expanding split collet and the collet receiver shaft, the jam nut driver having a grip end and a nut end, the nut end machined to receive a jam nut.

Further details of these and other embodiments and aspects of the invention are described more fully below.

BRIEF DESCRIPTION OF THE DRAWINGS

FIGS. 3A-1, 3A-2, 3A-3, 3B-1, 3B-2, 3C-1 and 3C-2 show expanding split collets for use in a tool for adjusting a military phone jack.

FIGS. 4A-1, 4A-2, 4A-3, 4B and 4C illustrate collet receiving shafts for use in a tool for adjusting a military phone jack.

FIGS. 5A-1, 5A-2, 5A-3, 5B, 5C and 5D show jam nut drivers for use in a tool for adjusting a military phone jack.

DESCRIPTION OF PREFERRED EMBODIMENTS

Described herein are various embodiments of a tool for tightening, loosening or otherwise adjusting the jam nut on a military phone jack. Such military phone jacks can be found, for example, on Fender Stratocaster or other guitars, or on other devices. The tool described herein is able to adjust the jam nut on a military phone jack is such a way as to reduce or prevent spinning of the jack so that wires inside the jack are not inadvertently repositioned, torn or otherwise damaged when adjustment of the jam nut occurs.

Figure 1A:
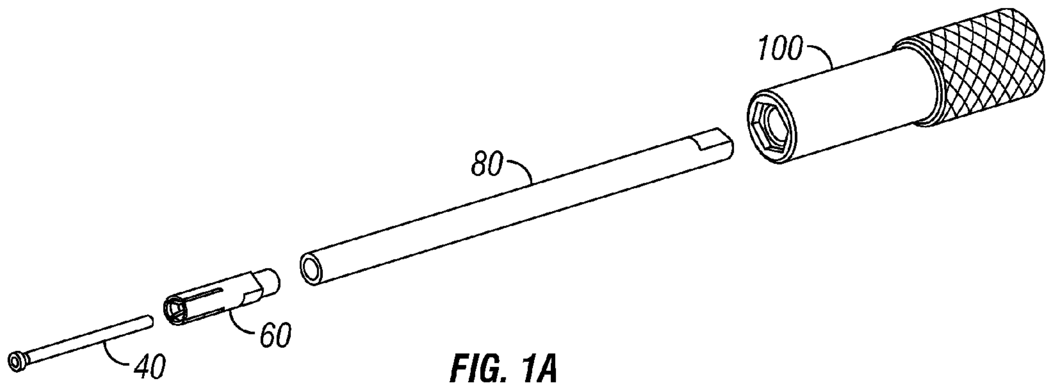
FIG. 1A shows the components for a tool for adjusting a military phone jack.
Figure 1B:
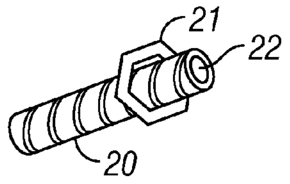
FIG. 1B illustrates a guitar jack.

FIG. 1A depicts one embodiment of the tool of the present invention. The tool comprises a modified socket head cap screw 40, an expanding split collet 60, a collet receiver shaft 80, and a jam nut driver 100. Shown in FIG. 1B is a guitar jack 20, with jam nut 21 and inner diameter 22.

Figure 2:
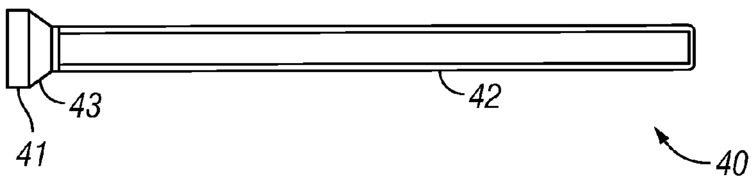
FIG. 2 illustrates a modified screw for use in a tool for adjusting a military phone jack.
Figure 2:
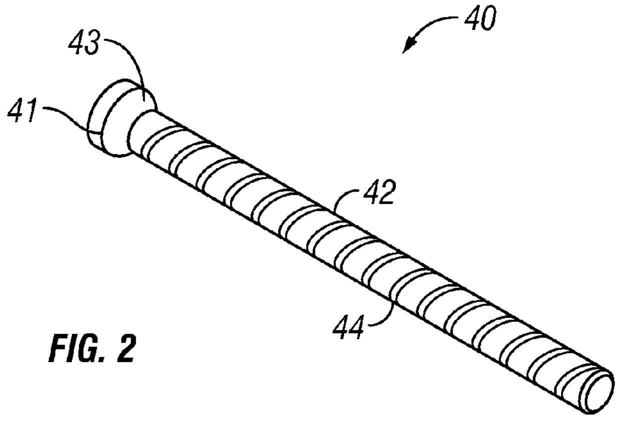

FIG. 2 shows an embodiment of modified socket head cap screw 40. Screw 40 can be made of any material used for socket head cap screws, with stainless steel being preferred. Screw 40 is a socket head cap screw ranging from 000-80 to 12-28 socket head cap screw, with a 4-40 socket head cap screw being preferred. Screw 40 has a head cap 41 and shaft 42. Screw 40 is modified such that the head cap 41 is machined to have an angle 43 ranging from about 1 to 89 degrees with respect to the unmachined portion of the head cap 41 which is further from the screw shaft, more preferably a range of about 15 to 85 degrees, such as an angle of 15, 30, 45, 60 or 75 degrees, with an angle of about 60 degrees being preferred. Screw 40 may be of any appropriate length, with a length generally ranging from about ¼ to 2½ inches, or a length of about ½ to 2 inches, or a length of about ¾ to 2 inches, with a length of 1⅞ inches being preferred. Tread 44 cover all or only a portion of shaft 42. When assembled in the tool, the modified socket head cap screw 40 functions by being drawn into expanding split collet 60 to cause expansion of collet 60. The angle 43 machined onto head cap 41 of screw 40 should have full contact with the machined angled diameter 64 of collet 60.

Figures 1, 3A:
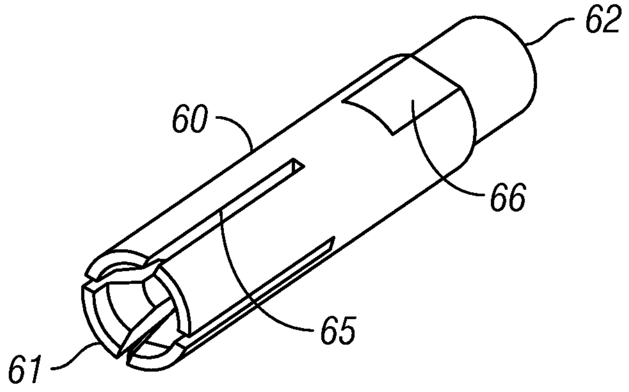
Figures 2, 3A:
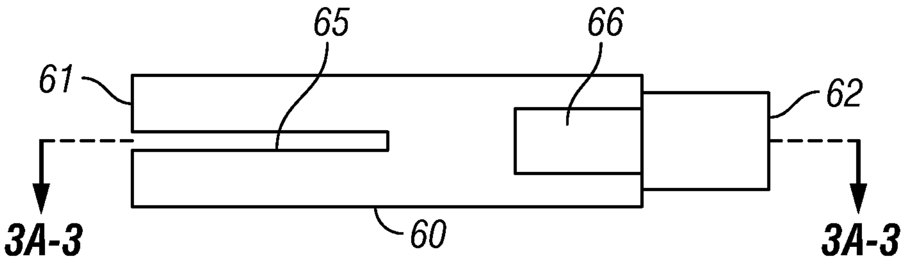
Figures 3, 3A:
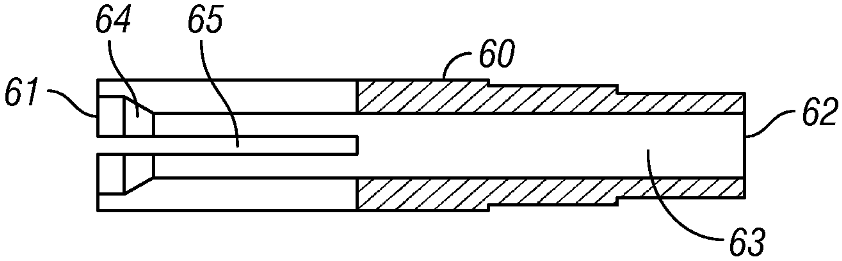

FIG. 3A depicts an embodiment of expanding split collet 60. Collet 60 is made of any appropriate material, including aluminum, stainless steel, ferrous metals, non-ferrous metals, an alloy, plastics and composites. Aluminum is a preferred material. End 61 of collet 60 is designed to slip into the inner diameter 22 of jack 20; the fitting should be one with flush, or near flush, contact between the outer diameter of the end 61 of collet 60 and the inner diameter 22 of jack 20. Thus, for a jack 20 with a ¼ inch internal diameter, the end 61 of collet 60 should have a diameter of about 0.250 thousands of an inch plus or minus 0.010 thousands of an inch. Collet 60 is shorter than modified screw 40, with collet 60 typically having a length ranging from about ½ to 2 inches, or ½ to 1½ inches, with a length of about 1 5/16 being preferred. Collet 60 has a hole 63 lengthwise through its center to receive modified screw 40. In one embodiment, hole 63 is about 0.112 thousands of an inch in diameter to receive a modified 4-40 socket head cap screw 40. However, hole 63 at end 61 of collet 60 is machined to angled diameter 64 so as to receive angle 43 of head cap 41 of screw 40. The angle 43 machined onto head cap 41 of screw 40 should have full contact with the machined angled diameter 64 of collet 60.

Figures 1, 3B:
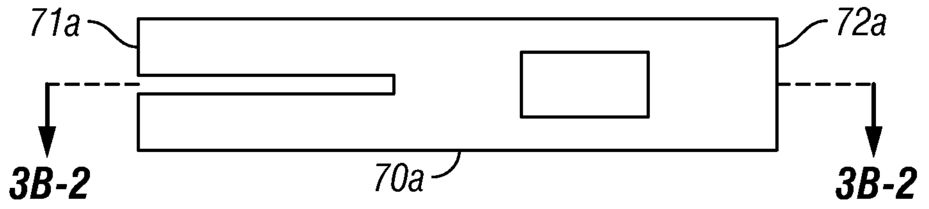
Figures 2, 3B:
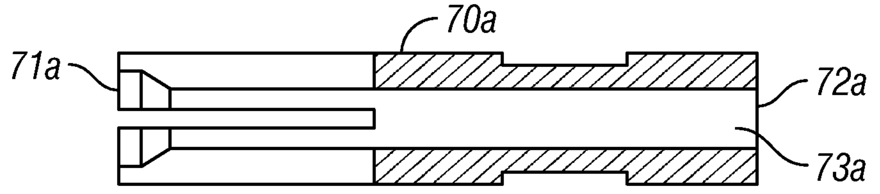
Figures 1, 3C:
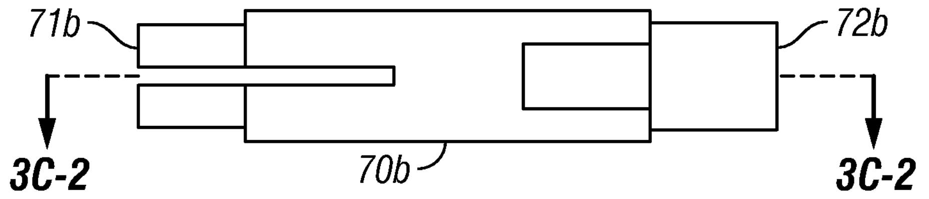
Figures 2, 3C:
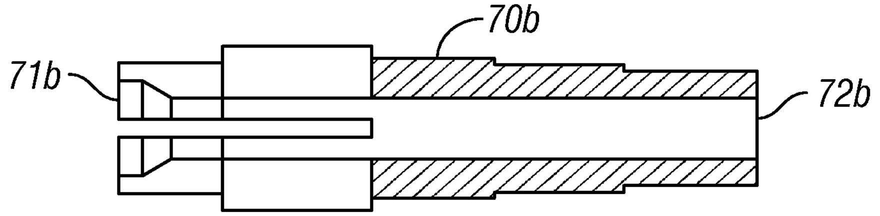

Collet 60 may have two, three, four or more slits 65 cut into the outer diameter of collet 60, beginning at end 61. Four slits are preferred. The slits 65 are preferably, but not necessarily, equidistant from each other around the outside of collet 60. The slits 65 are of appropriate length and width to allow expansion of end 61 of collet 60 to occur upon drawing screw 40 into end 61 of collet 60. Thus, the slits 65 may range from about 3/16 to 1 inch in length starting at end 61 of collet 60, with ½ inch being a preferred length. The slits 65 may range from about 0.010 to 0.050 thousands of an inch in width, with 0.030 thousands of an inch being preferred. In one embodiment, end 62 of collet 60 has a diameter which allows it to bottom out in counter bore 81 of collet receiver shaft 80. End 62 preferably has a narrower diameter than end 61 of collet 60. When end 62 has a narrower diameter than end 61, then end 62 may range, for example, from about 0.125 to 0.200 thousands of an inch in diameter, and this narrower diameter end may range from, for example, ¼ to ½ inch or longer. Collet 60 optionally has two milled wrench flats 66, preferably but not necessarily 180 degrees apart. An additional option is for a knurled grip to replace the wrench flats. In another embodiment (FIG. 3B), collet 71*a* has an end 72*a* which is the same diameter as the rest of the outer diameter of collet 71*a*. Collet 71*a* could be used, for example, with collet receiver shaft 85 so that end 72*a* of collet 71*a* would rest flush with of collet receiver shaft 85, allowing hole 73*a* of collet 71*a* to line up with internal thread 86 of collet receiver shaft 85. In yet another embodiment (FIG. 3C), collet 70*b* has end 71*b* which is smaller in diameter than the main body of collet 70*b*. However, since end 71*b* of collet 70*b* has a diameter which allows it to tightly fit the inner diameter 22 of jack 20, then the main body of collet 70*b* serves to stop collet 70*b* from being pushed too far into jack 20.

Figures 1, 4A:
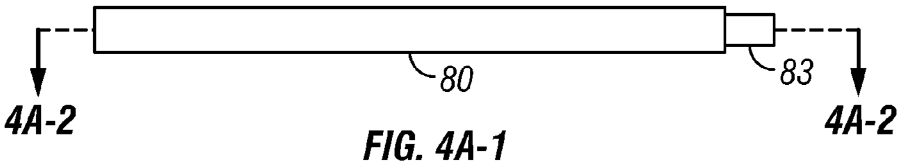
Figures 2, 4A:
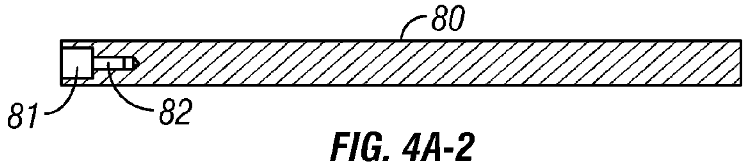
Figures 3, 4A:
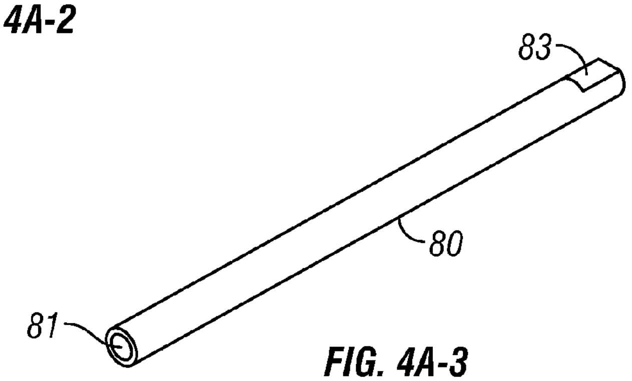
Figure 4B:
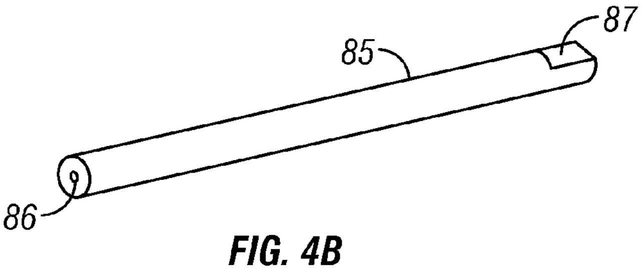
Figure 4C:
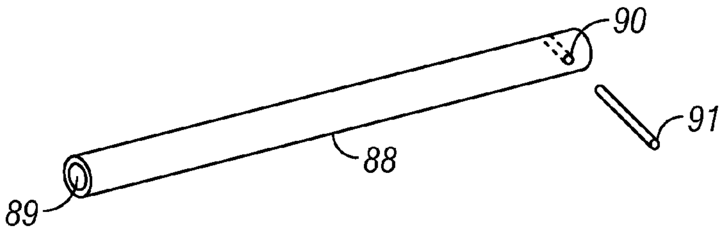

FIG. 4A depicts an embodiment of collet receiver shaft 80. Shaft 80 is made of any appropriate material, including aluminum, stainless steel, ferrous metals, non-ferrous metals, an alloy, plastics and composites. Aluminum is a preferred material. Collet receiver shaft 80 is of any appropriate length and diameter to receive end 62 of expanding split collet 60. Shaft 80 may have, for example, a length ranging from about 1 to 6 inches, with 4 inches being a preferred length. Also, shaft 80 may have, for example, a diameter ranging from about ¼ to ½ inches, with 5/16 inches being a preferred diameter. Collet receiver shaft 80 may have one end that is counter bored 81, drilled and tapped with an internal thread 82. The counter bore is of a diameter appropriate to receive end 62 of collet 60; for example, the counter bore may have a depth ranging from 0.005 thousands of an inch to 2 inches, or deeper, and a diameter ranging, for example, from 0.125 thousands of an inch to 0.202 thousands of an inch, or lesser or greater depending on the diameter of collet receiver shaft 80. The internal thread may, for example, range from 000-80 to 12-28, with a thread of 4-40 being preferred. In one embodiment, the counter bore is 0.202 thousand of an inch in diameter by ¼ inch deep. In another embodiment, there is no counter bore, as shown FIG. 5B, where collet receiving shaft 85 is drilled and tapped with internal thread 86 but otherwise will rest flush, for example, with end 72*a* of expanding collet 70*a*. The collet receiving shaft may also be modified to aid in its rotation, such as the placement of wrench flats 83, 87, which typically are 180 degrees apart and are appropriate dimensions to receive a wrench, such as 0.225 thousands of an inch wide and ⅜ of an inch long. In another embodiment containing a rotation aid (FIG. 5C), collet receiver shaft 88 has hole 90 bored through the end of shaft opposite the end of counter bore 89. Hole 90 is of an appropriate size to receive pin 91, which is of a length such that, when place in hole 90, it overlaps the edges of shaft 88.

Figures 1, 5A:
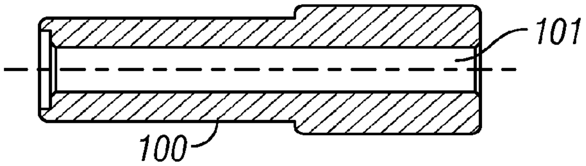
Figures 2, 5A:
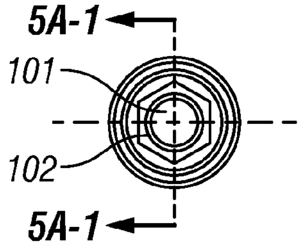
Figures 3, 5A:
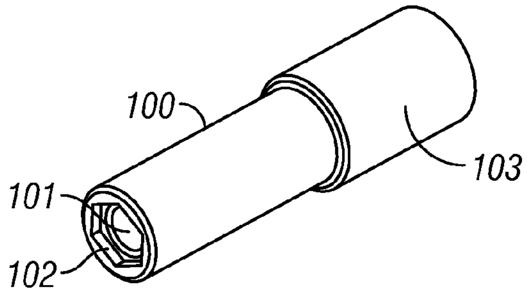
Figure 5C:
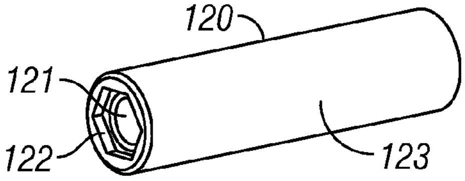
Figure 5B:
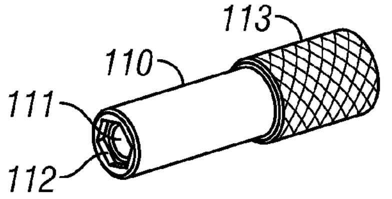
Figure 5D:
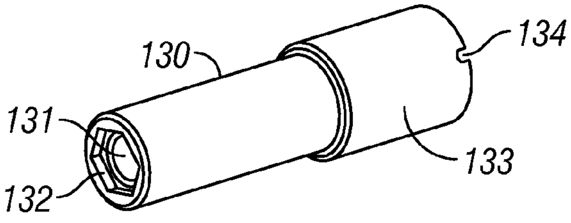

FIG. 5A shows an embodiment of jam nut driver 100. Driver 100 is made of any appropriate material, including aluminum, stainless steel, ferrous metals, non-ferrous metals, an alloy, plastics and composites. Aluminum is a preferred material. Jam nut driver 100 is of any appropriate length but typically ranges, for example, from about ½ to 5 inches long, but could be longer, with a length of about 3 inches being preferred. The jam nut driver 100 has a hole 101 which runs longitudinally through its center. The hole 101 is large enough to allow free movement of the collet receiver shaft 80 through the jam nut driver 100. Hole 101 may be uniform in diameter but this is not necessary, as long as there can be free movement of the collet receiver shaft 80 through the jam nut driver 100. One end of the jam nut driver 100 includes a machined hexagon 102 which is used for tightening jam nut 21. Thus, the machined hexagon 102 is machined to a size that will slip over the jam nut 21 so that tightening and/or loosening of jam nut 21 can take place. The hexagon 102 will typically have a standard size of 0.472 inches (12 mm) or ½ inch, but the hexagon could be machined to fit any hex nut, such as those ranging from 3/16 to ¾ inches. The machined hexagon is deep enough to receive jam nut 21, such as a depth of 0.005 thousands of an inch to ½ inch, or deeper if necessary. In other embodiments, a shape other than a hexagon may be machined into the end of the jam nut driver 100, such as a square, to fit the shape of the jam nut on the guitar jack 20. The jam nut driver 100 has an external diameter sufficient to maintain its structural integrity, such as an external diameter of 0.7 inches or greater, and a wall thickness generally of 0.2 inches or greater. The grip end 103 of the jam nut driver 100 opposite the machined hexagon 102 may be of a diameter greater than the hexagon-end in order to facilitate grasping the jam nut driver 100. In FIG. 6A, grip end 103 has a smooth surface. There are numerous variations for the grip end of the jam nut driver. For example, in FIG. 6B, jam nut driver 110, with hole 111 and machined hexagon 112, has a knurled grip end 113. In FIG. 6C, jam nut driver 120, with hole 121 and machined hexagon 122, has a grip end 113 which has no modifications. And in FIG. 6D, jam nut driver 130, with hole 131 and machined hexagon 132, has a grip end 133 which includes a notched end 134 for receiving pin 91 in collet receiver shaft 88. The grip end of the jam nut driver is typically about half of the length of the driver, with a preferred grip size of 1 3/16 inches and diameter of ⅞ inches.

Expanding split collet 60, collet receiver shaft 80, and jam nut driver 100 have all been described as cylindrical objects. However, the outer surfaces of these elements could have a square, hexagonal, octagonal or other shape as long as tightening of screw 40 can take place as described below, and also as long as end 61 of split collet 60 retains a cylindrical shape so that tight contact can be made with inner diameter 21 or jack 20.

To assemble the tool, threaded end of modified screw 40 is inserted into end 61 of expanding split collet 60 until the 60-degree angle 43 of the screw head is flush with the 60-degree angle 64 on the inside of the split collet 60. The threaded end of screw 44 is inserted into counter-bored end 81 of collet receiver shaft 80 and tightened in a clockwise direction into internal thread 82. End 62 of expanding split collet 60 sits inside counter boring 81 of collet receiving shaft 80, shoulder flush with the top of the shaft.

To use the tool, end 61 of expanding split collet 60 is inserted into inner diameter 22 of jack 20 to a depth of, preferably, 3/16 of an inch. The depth can be shallower or deeper as long as reliable contact can be made between expanding split collet 60 and the inner diameter 22 of jack 20. For example, expanding split collet 60 could be inserted to a depth of ½ inch or more. The collet receiving shaft 80 is then rotated around its axis so as to tighten screw 40. The collet receiving shaft 80 can be grasped with the fingers to rotate it, or a rotation aid can be use. For example, a wrench can be used via wrench flat 87 to rotate shaft 80. Alternatively, if collet receiving shaft 88 is in use, then pin 91 can be turned by use of fingers, or pin 91 can be positioned into notch 134 in jam nut driver 130 and the driver can then be turned so as to cause rotation of shaft 88, thereby tightening screw 40. By tightening screw 40, expansion of end 61 of collet 60 takes place thereby resulting in secure contact between collet 60 and inner diameter 22 of jack 20. During tightening of screw 40, care must be taken to keep collet 60 from rotating. Thus, collet 60 can be grasped with fingers, for example, or a wrench could be affixed to wrench flat 66. Any method for keeping collet 60 from rotating during screw tightening is contemplated.

The jam nut driver 100 is positioned over the protruding shaft with the hex end toward the jack 20 and slid forward until hex 102 is securely covering jam nut 21. To tighten jam nut 21, the user holds the shaft steady with one hand and grasps grip end 103 of jam nut driver 100, turning the nut driver 100 clockwise to tighten, counter-clockwise to loosen.

To remove the tool, the user disengages nut driver's 100 hex end from nut 22 and removes the driver from the shaft. The end 61 of the expanding split collet 60 is loosened, for example, by ⅛ of a turn counter-clockwise, and the tool is disengaged from jack 20.

Use of the tool is not limited to guitar jacks. It can be used on musical effect pedals, Amplifiers, or anything that uses a SAE or ANSI 14.5 or newer ANSI military phone jack.

CONCLUSION

The foregoing description of various embodiments of the invention has been presented for purposes of illustration and description. It is not intended to limit the invention to the precise forms disclosed. Many modifications, variations and refinements will be apparent to practitioners skilled in the art.

Elements, characteristics, or acts from one embodiment can be readily recombined or substituted with one or more elements, characteristics or acts from other embodiments to form numerous additional embodiments within the scope of the invention. Moreover, elements or acts that are shown or described as being combined with other elements or acts, can, in various embodiments, exist as standalone elements or acts. Hence, the scope of the present invention is not limited to the specifics of the described embodiments, but is instead limited solely by the appended claims.

What is claimed is:

1. A tool for adjusting a military phone jack, the tool comprising:

a modified head cap screw which has an edge of the head cap machined to an angle between 1 and 89 degrees with respect to the unmachined portion of the head cap which is further from the screw shaft;

an expanding split collet which comprises a central hole throughout its longitudinal axis with the hole of sufficient diameter to receive the modified head cap screw, two or more slits through the exterior wall of the collet and extending from one end of the collet, and a machined inner diameter of the end of the collet having the slits, the angle of the machined inner diameter matching the angle on the head cap of the modified head cap screw;

a collet receiver shaft having an internal thread drilled into one end of the shaft, the internal thread receiving the thread end of the modified head cap screw, and;

a jam nut driver, which comprises a central hole throughout its longitudinal axis, the hole of sufficient diameter to receive the expanding split collet and the collet receiver shaft, the jam nut driver having a grip end and a nut end, the nut end machined to receive a jam nut.

2. The tool of claim 1, wherein the modified head cap screw is comprised of stainless steel.

3. The tool of claim 1, wherein the expanding split collet, the collet receiver shaft and the jam nut driver are comprised of aluminum.

4. The tool of claim 1, wherein the modified head cap screw machined angle and the expanding split collet angle is 60 degrees.

5. The tool of claim 1, wherein the expanding split collet has four slits.

6. The tool of claim 1, wherein the end of the expanding split collet opposite the slit end has a diameter which fits within a counter bore on the end of the collet receiver shaft which has the internal thread.

7. The tool of claim 1, wherein the collet receiver shaft has a counter bore on the end of the shaft with the internal thread.

8. The tool of claim 1, wherein the outer diameter of the collet receiver shaft has a wrench flat.

9. The tool of claim 1, wherein the collet receiver shaft has a hole drilled through its width, the hole containing a removable pin.

10. The tool of claim 9, wherein the grip end of the jam nut driver has a notch across the end to receive the removable pin.

11. The tool of claim 1, wherein the nut end of the jam nut driver is machined to receive a hex nut.

* * * * *